US007219912B2

(12) United States Patent
Meyer

(10) Patent No.: US 7,219,912 B2
(45) Date of Patent: May 22, 2007

(54) RAISING WHEEL CHAIR

(75) Inventor: Bruno Meyer, Wohlen (CH)

(73) Assignee: Levo AG, Wohlen (CH)

( * ) Notice: Subject to any disclaimer, the term of this patent is extended or adjusted under 35 U.S.C. 154(b) by 0 days.

(21) Appl. No.: 10/804,154

(22) Filed: Mar. 19, 2004

(65) Prior Publication Data

US 2004/0173998 A1 Sep. 9, 2004

Related U.S. Application Data

(63) Continuation of application No. PCT/CH02/00519, filed on Sep. 20, 2002.

(30) Foreign Application Priority Data

Sep. 21, 2001 (CH) ........................... 2001 1745/01

(51) Int. Cl.
*A61G 5/10* (2006.01)
*B62M 1/14* (2006.01)

(52) U.S. Cl. .............................. 280/304.1; 280/250.1; 280/657; 297/337

(58) Field of Classification Search ............. 280/304.1, 280/250.1, 657; 297/316, 423.38, DIG. 10, 297/DIG. 4, 330
See application file for complete search history.

(56) References Cited

U.S. PATENT DOCUMENTS

| | | | | |
|---|---|---|---|---|
| 3,191,990 | A * | 6/1965 | Rugg et al. | 297/DIG. 4 |
| 3,261,031 | A * | 7/1966 | Gates | 297/DIG. 4 |
| 3,379,450 | A * | 4/1968 | Jones et al. | 280/657 |
| 3,630,569 | A | 12/1971 | Lory | |
| 3,964,786 | A * | 6/1976 | Mashuda | 297/330 |
| 4,054,319 | A | 10/1977 | Fogg, Jr. et al. | |
| 4,067,249 | A | 1/1978 | Deucher | |
| 4,076,304 | A | 2/1978 | Deucher | |
| 4,407,543 | A * | 10/1983 | Mashuda | 297/330 |
| 4,456,086 | A | 6/1984 | Wier et al. | |
| 4,623,194 | A | 11/1986 | Pillot | |
| 4,884,841 | A * | 12/1989 | Holley | 297/DIG. 10 |
| 5,346,280 | A * | 9/1994 | Deumite | 297/330 |
| 5,366,036 | A | 11/1994 | Perry | |
| 5,803,545 | A | 9/1998 | Guguin | |
| 5,984,338 | A | 11/1999 | Meyer | |
| 6,125,957 | A * | 10/2000 | Kauffmann | 297/DIG. 10 |
| 6,179,076 | B1 | 1/2001 | Fernie et al. | |
| 6,192,533 | B1 * | 2/2001 | Porcheron | 280/304.1 |

FOREIGN PATENT DOCUMENTS

| | | |
|---|---|---|
| EP | 0 526 088 A1 | 2/1993 |
| FR | 2 589 341 | 5/1987 |
| FR | 2 697 418 | 5/1994 |
| WO | 79/00647 | 9/1979 |
| WO | 82/01314 | 4/1982 |
| WO | 01/87219 A1 | 11/2001 |

* cited by examiner

*Primary Examiner*—Hau Phan
(74) *Attorney, Agent, or Firm*—Buchanan Ingersoll & Rooney PC

(57) ABSTRACT

A raising wheel chair includes a lifting device with a telescopic guide. With the lifting device, the raising frame can be moved up and down both in sitting and in standing position. It is therefore possible to vary the level of the seat or the footrest. Thanks to the tilted arrangement of the telescopic guide, the user of the chair will, on an upward movement, also be moved closer to the objects of interest. The inclined arrangement of the telescopic guide can provide room for the front wheels and permit a short length of the raising wheel chair.

12 Claims, 4 Drawing Sheets

RAISING WHEEL CHAIR

CROSS REFERENCE TO RELATED APPLICATIONS

This application claims priority under 35 U.S.C. §119 to Swiss Application 1745/01 filed in Switzerland on 21 Sep. 2001, and as a continuation application under 35 U.S.C. §120 to PCT/CH02/00519 filed as an International Application on 20 Sep. 2002 designating the U.S., the entire contents of which are hereby incorporated by reference in their entireties.

This application corresponds to commonly assigned U.S. Patent Application entitled "RAISING WHEEL CHAIR," Ser. No. 10/804,135 which is filed on even date herewith and which is hereby incorporated herein by reference in its entirety.

BACKGROUND

A raising wheel chair is disclosed which includes a wheel frame, a raising or erecting frame, and a lifting device capable of adjusting the height level of the raising frame, both in the sitting and in the standing position of the user of the raising wheel chair. U.S. Pat. No. 4,076,304 describes a raising wheel chair with a wheel frame and a raising or erecting frame. The erecting frame is provided with a seat, a back rest and foot rests. Both in the sitting position and in the standing position of the user the back rest is kept in upright position by a parallelogram lever. On a transfer from the sitting position to the standing position of the user the foot rests are moved downward and come to rest on the floor. Also the raising wheel chair according to U.S. Pat. No. 4,623,194, which has a somewhat different mechanism functions in the same way.

U.S. Pat. No. 4,054,319 discloses a motorized raising chair on which the feet of the user rest on a platform of the chassis both in the sitting position and in the standing position. This has the advantage that also in the standing position the user can move around with the wheel chair.

WO 01/87219 discloses a wheel chair for use by disabled persons. It has an electrical lifting device which extends from the front region of the wheel frame to the front region of the raising frame and serves for aiding the person to stand up. In order to stand up the user of the chair must glide forward on the seat and remove his feet from the footrest. Operation of the lifting device provides first a slight tilting and then an upward movement of the seat to assist the person to stand up. This assisting device is not suitable for users of wheel chairs, e.g. tetraplegics, who are more than only handicapped in walking.

The disclosures of all of the foregoing patent documents are hereby incorporated by reference in their entireties.

Raising wheel chairs on the market permit the user not only to move from a sitting position to a standing position, but also permit vertical lifting when the user is in the sitting or the standing position. For this purpose a lifting device is provided with which the raising frame can be lifted in the sitting position as well as in the standing position. The lifting or lowering of the sitting or standing level can substantially increase the freedom of action of the user of the wheel chair. It permits the user to reach for objects located in elevated shelves. This obviates costly renovation of his house or apartment. However, these wheel chairs have several disadvantages. They are not permitting driving around in the standing position, because of the danger of overturning. A further disadvantage of certain wheel chairs is that on lifting a backward movement takes place. This may prevent overturning, but makes it difficult or impossible to take objects from an elevated shelve. A further disadvantage of prior art wheel chairs is their limited capability to move over obstacles or to maneuver in narrow space. Finally it may be mentioned that on prior art raising wheel chairs the lifting device can require much space and makes it difficult to obtain access to important parts, (e.g., the batteries) of the raising wheel chair.

SUMMARY

An improved raising wheel chair is disclosed.

An exemplary raising chair is disclosed wherein the lifting device extends from the front region of the wheel frame to the front region of the raising frame and is of such a construction that on a lifting operation the raising frame is moved both upward and forward. In this way the user is moved closer to the objects of interest and can easily get access to them. In this way the user of the wheel chair will be in a position to carry out work which with prior art raising chairs cannot or only with difficulties can be carried out. This advantage of the raising wheel chair is highly rated by ergotherapists.

Another advantage of the raising wheel chair is that parts, such as batteries and motors, located in the wheel frame will be easily accessible after the raising frame has been lifted or put into the standing position.

The front edge of the seat can be located at a distance from the axis around which the seat is rotated on rising, so that on rising the user is moved by this distance in forward direction. In this way the user of the wheel chair is moved still closer to the objects of interest and can grip them with still more ease. This design provides also for a good biomechanical adaption of the raising mechanism. This advantage is considered important by physiotherapists.

The lifting device can comprise on each side of the chair telescopic guide means. This results in a particular stable construction. If the telescopic guide means are arranged such that they have a forward inclination from bottom to top, the front wheels can be located close to the middle wheels which results in a reduction of length and consequently provides for better maneuverability of the wheel chair. The wheel frame can be provided with drive means for middle wheels. Such a middle wheel drive has substantial advantages, such as providing good maneuverability and permitting easy overcoming of obstacles.

The raising chair can comprise a knee restraint with means to move it forward when a raising motion of the raising frame takes place. This contributes substantially to the comfort of the user of the wheel chair, because it prevents overly tight fitting of the knee restraints on standing up.

The knee restraint can be located on a downward extending tilting lever which is coupled to the raising frame. In this way the desired movement of the knee restraint on standing up and sitting down can be obtained with simple means.

BRIEF DESCRIPTION OF THE DRAWINGS

An embodiment will now be described with reference to the drawing, wherein.

DETAILED DESCRIPTION

Figure 1:
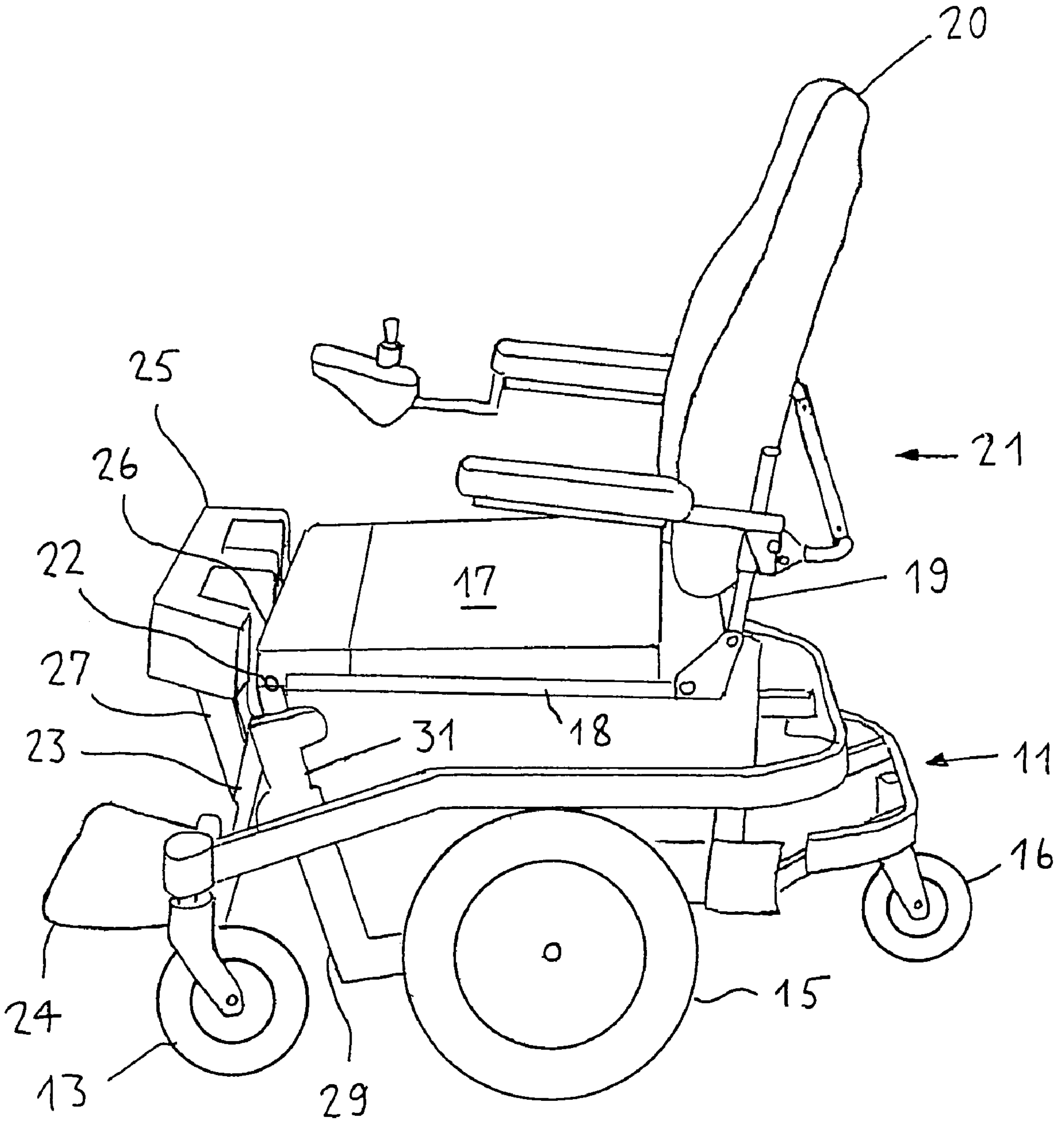
FIG. 1 shows an exemplary raising chair in sitting position with the seat on the lowest level.
Figure 2:
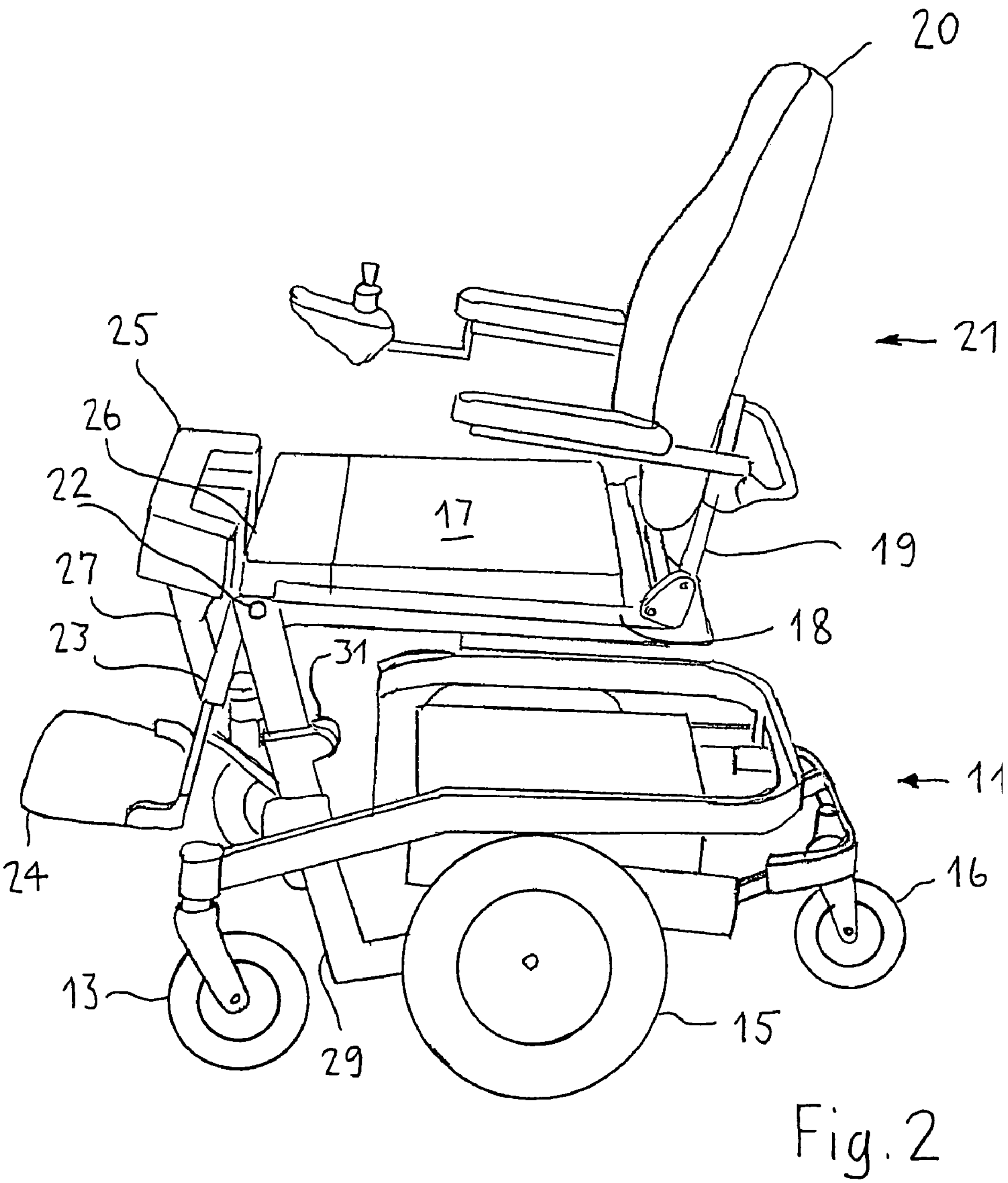
FIG. 2 shows the raising chair of FIG. 1 after it has been moved with the lifting device to a higher level.
Figure 3:
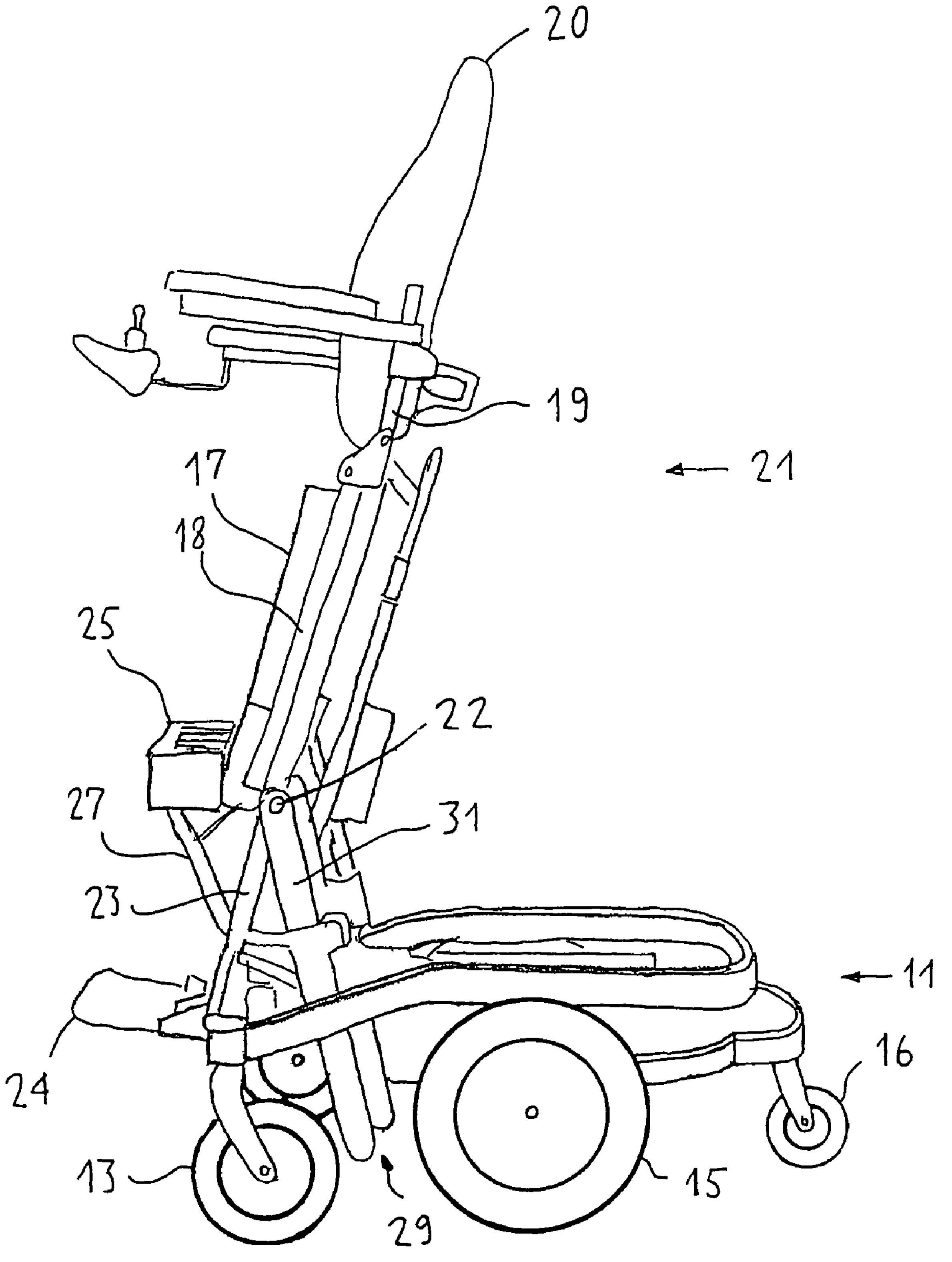
FIG. 3 shows the raising chair on the higher level as in FIG. 2, but in upright or standing position.

The raising chair as disclosed in the FIGS. 1 to 4 is also subject of the aforementioned copending U.S. application. The raising chair of FIG. 1 comprises substantially a wheel frame 11, a raising frame 21, and a lifting device 29. The wheel frame can be provided with the middle wheel drive as described for example in WO 96/15752, the disclosure of which is hereby incorporated by reference in its entirety. The wheel frame 11 comprises two front wheels 13, two motor driven middle wheels 15 and a rear wheel 16.

Figure 4:
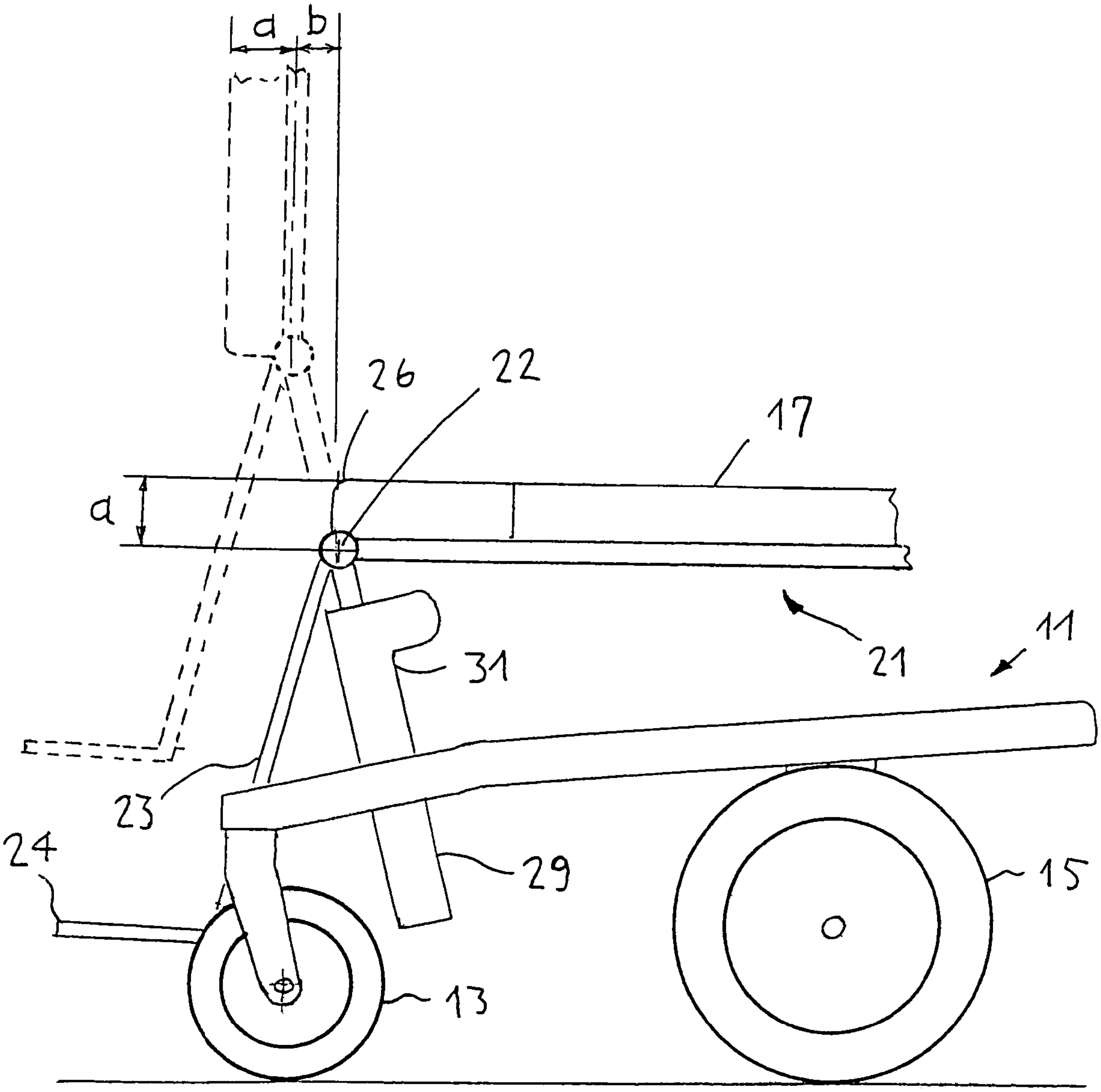
FIG. 4 shows a schematic representation of the positions of FIGS. 1 and 3.

The raising frame 21, which in details can be designed as in the prior art, comprises a seat support 18, on which the seat 17 is located, and a backrest support 19, on which a backrest 20 is located. The seat 17 can comprise a two-piece pillow. The foot rest assembly 23 with the footrest 24 is pivotally connected to the raising frame 21 at 22. The front edge 26 of the seat 17 is located at a distance a above the axis 22, so that on standing up, the user of the wheel chair is moved forward by this distance (FIG. 4). Further, a knee restraint 25 is provided, which is located on a tilding lever 27 coupled to the raising frame 21. On standing up of the user the tilding arm 27 moves the knee restraint 25 forward to prevent excessive pressing of the knee restraint 25 on the legs of the user.

Of importance is the lifting device 29 with which the level of the raising device 21 above ground can be varied. From the drawing the particular design of the lifting device 29 is visible. The lifting device 29 extends from the front region of the wheel frame 11 to the front region of the raising frame 21. The lifting device 29 is inclined so that the front wheels 13 can be located close to the middle wheels 15, but still permitting the necessary maneuvering space for the front wheels. This arrangement provides on a lifting motion the movement of the lifting frame 21 in an upward and forward direction, so that the user of the wheel chair is moved without problems close to the desired objects.

In FIG. 4 the extent of the forward movement caused by the lifting device 29 is designated by b.

The lifting device 29 comprises on each side of the chair telescopic guide means 31 having a forward inclination from bottom to top.

Summarizing the following can be stated: The raising wheel chair comprises a lifting device 29 with telescopic guide means 31. With the lifting device 29 the raising frame 21 can be moved up and down both in sitting and in standing position. It is therefore possible to vary the level of the seat 27 or the footrest 24. Thanks to the tilted arrangement of the telescopic guide means 31 the user of the chair will, on an upward movement, also be moved closer to the objects of interest. The inclined arrangement of the telescopic guide means 31 provides also room for the front wheels 13 and permits a short length of the raising wheel chair.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A raising wheel chair comprising:
   - a wheel frame;
   - a raising frame with a seat, a backrest and a footrest;
   - a knee restraint;
   - means to move the knee restraint forward when a raising motion of the raising frame takes place; and
   - a lifting device for adjusting the height of the raising frame both in a sitting position and in a standing position, wherein the lifting device has a forward inclination from bottom to top, so that on a lifting operation the raising frame is moved both upward and forward in the sitting and in the standing position.

2. The raising chair as claimed in claim 1, wherein a front edge of the seat is located at a distance from an axis around which the seat is rotated on raising.

3. The raising chair as claimed in claim 2, wherein the lifting device comprises on each side of the chair telescopic guide means.

4. The raising chair as claimed in claim 3, wherein the telescopic guide means have a forward inclination from bottom to top.

5. The raising chair as claimed in claim 4, wherein the wheel frame is provided with a middle wheel drive.

6. The raising chair as claimed in claim 5, wherein the knee restraint is located on a downward extending tilting lever which is coupled to the raising frame.

7. The raising chair as claimed in claim 1, wherein the lifting device comprises on each side of the chair telescopic guide means.

8. The raising chair as claimed in claim 7, wherein the telescopic guide means have a forward inclination from bottom to top.

9. The raising chair as claimed in claim 1, wherein the wheel frame is provided with a middle wheel drive.

10. The raising chair as claimed in claim 1, wherein the knee restraint is located on a downward extending tilting lever which is coupled to the raising frame.

11. The raising chair according to claim 1, wherein the seat comprises a front part and a back part.

12. A raising chair comprising:
   - a wheel frame;
   - a raising frame provided with a seat, a back rest, a foot rest, and a knee restraint, the seat being pivotable in relation to the foot rest;
   - means to move the knee restraint forward when a raising motion of the raising frame takes place; and
   - a lifting device for adjusting a height level of the raising frame both in a sitting and in a standing position, wherein the lifting device extends from a front region of the wheel frame to a front region of the raising frame and is of such a construction that on a lifting operation the raising frame is moved both upward and forward, the lifting operation elevating the foot rest in relation to the wheel frame.

* * * * *